(12) United States Patent
Sakamoto et al.

(10) Patent No.: US 8,943,535 B2
(45) Date of Patent: Jan. 27, 2015

(54) ADVERTISEMENT DISTRIBUTION APPARATUS AND ADVERTISEMENT DISTRIBUTION METHOD

(71) Applicant: Yahoo Japan Corporation, Tokyo (JP)

(72) Inventors: Ryuki Sakamoto, Tokyo (JP); Teruhiko Teraoka, Tokyo (JP); Tomonori Saita, Tokyo (JP); Hiroshi Machida, Tokyo (JP); Kohei Yokoi, Tokyo (JP)

(73) Assignee: Yahoo Japan Corporation, Tokyo (JP)

( * ) Notice: Subject to any disclaimer, the term of this patent is extended or adjusted under 35 U.S.C. 154(b) by 0 days.

(21) Appl. No.: 13/953,085

(22) Filed: Jul. 29, 2013

(65) Prior Publication Data

US 2014/0059588 A1 Feb. 27, 2014

(30) Foreign Application Priority Data

Aug. 22, 2012 (JP) ................................. 2012-183466

(51) Int. Cl.
*H04N 7/10* (2006.01)
*H04N 7/025* (2006.01)
*H04N 21/435* (2011.01)

(52) U.S. Cl.
CPC .................................. *H04N 21/435* (2013.01)
USPC ......................................................... 725/32

(58) Field of Classification Search
None
See application file for complete search history.

(56) References Cited

U.S. PATENT DOCUMENTS

| 8,490,132 | B1* | 7/2013 | Shi et al. | 725/42 |
| 2002/0081020 | A1* | 6/2002 | Shimazu | 382/154 |

FOREIGN PATENT DOCUMENTS

| JP | A-9-10440 | 1/1997 |
| JP | A-2002-77726 | 3/2002 |
| JP | A-2003-069977 | 3/2003 |
| JP | A-2007-157111 | 6/2007 |
| JP | A-2009-207181 | 9/2009 |
| JP | A-2012-048639 | 3/2012 |

OTHER PUBLICATIONS

Feb. 18, 2014 Office Action issued in Japanese Patent Application No. 2012-183466 (with translation).
Apr. 30, 2014 Office Action issued in Japanese Patent Application No. 2012-183466 (with translation).

* cited by examiner

*Primary Examiner* — Oschta Montoya
(74) *Attorney, Agent, or Firm* — Oliff PLC

(57) ABSTRACT

An advertisement distribution apparatus includes: a receiver that receives a display request including a viewpoint condition and advertisement information; an advertisement space setting unit that sets an advertisement space corresponding to the viewpoint condition to video data of an arbitrary viewpoint position generated based on imaging data having different viewpoint positions; an advertisement information setting unit that sets the advertisement information received by the receiver to the advertisement space set by the advertisement space setting unit; and a video transmitter that transmits the video data of the arbitrary viewpoint position in which the advertisement information is set in the advertisement space to a terminal device.

11 Claims, 9 Drawing Sheets

| ADVER-TISEMENT ID | VIEWPOINT POSITION | VIEWING DIRECTION | VIEW ANGLE | PAYMENT AMOUNT | DISPLAY PERIOD | ADVERTISEMENT INFORMATION STORAGE LOCATION |
|---|---|---|---|---|---|---|
| 10001 | x1, y1, z1 | Vx1, Vy1, Vz1 | 60° | 150 YEN | 1 HOUR | /10001/ad1/ |
| 10002 | x2, y2, z2 | Vx2, Vy2, Vz2 | 60° | 200 YEN | 3 HOURS | /10002/ad2/ |
|  | x3, y3, z3 | Vx3, Vy3, Vz3 | 60° |  |  |  |
|  | x4, y4, z4 | Vx4, Vy4, Vz4 | 30° |  |  |  |
| 10003 | x3, y3, z3 | Vx3, Vy3, Vz3 | 60° | 100 YEN | 2 HOURS | /10003/ad3/ |
| ⋮ | ⋮ | ⋮ | ⋮ | ⋮ | ⋮ | ⋮ |

FIG.5

| ADVERTISEMENT ID | VIEWPOINT POSITION | VIEWING DIRECTION | VIEW ANGLE | REMAINING DISPLAY PERIOD |
|---|---|---|---|---|
| 10001 | x1, y1, z1 | Vx1, Vy1, Vz1 | 60° | 00:25 (HH/MM) |
| 10002 | x2, y2, z2 | Vx2, Vy2, Vz2 | 60° | 1:32 (HH/MM) |
| | x3, y3, z3 | Vx3, Vy3, Vz3 | 60° | |
| | x4, y4, z4 | Vx4, Vy4, Vz4 | 30° | |
| ⋮ | ⋮ | ⋮ | ⋮ | ⋮ |

FIG.6

| ADVERTISEMENT SPACE ID | VIEWPOINT CONDITION | | | LOWEST PRICE | HIGHEST PRICE |
| | VIEWPOINT POSITION | VIEWING DIRECTION | VIEW ANGLE | | |
|---|---|---|---|---|---|
| 2001 | x1, y1, z1 | Vx1, Vy1, Vz1 | 60° | 100 YEN | 400 YEN |
| 2002 | x2, y2, z2 | Vx2, Vy2, Vz2 | 45° | 80 YEN | 320 YEN |
| ⋮ | ⋮ | ⋮ | ⋮ | ⋮ | ⋮ |

34a, 34b
ADVERTISEMENT INFORMATION
ADVERTISEMENT INFORMATION
VIEWPOINT POSITION 34a, 34b
ADVERTISEMENT INFORMATION
ADVERTISEMENT INFORMATION

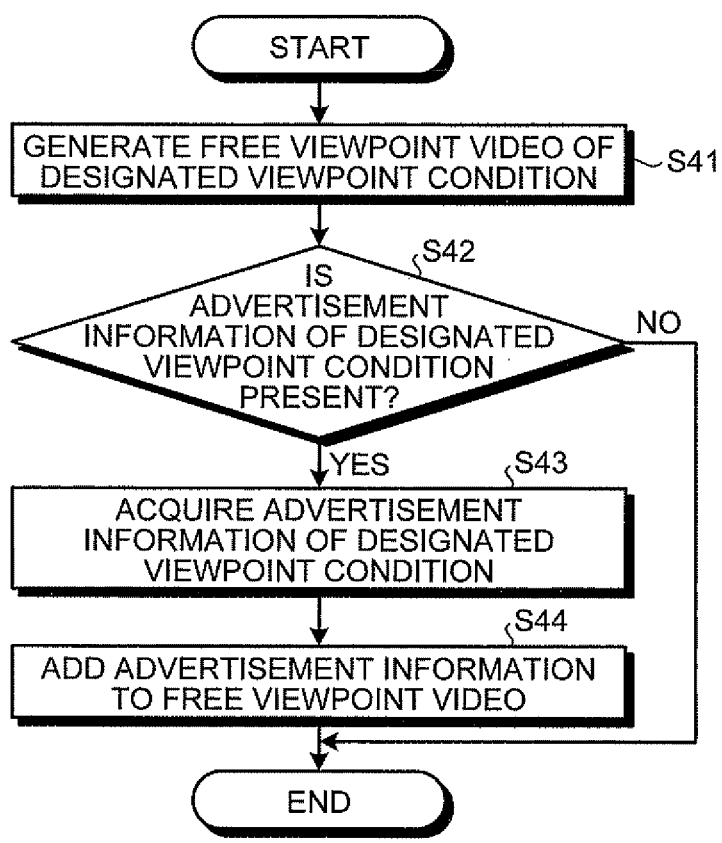

ADVERTISEMENT DISTRIBUTION APPARATUS AND ADVERTISEMENT DISTRIBUTION METHOD

CROSS-REFERENCE TO RELATED APPLICATIONS

The present application claims priority to and incorporates by reference the entire contents of Japanese Patent Application No. 2012-183466 filed in Japan on Aug. 22, 2012.

BACKGROUND OF THE INVENTION

1. Field of the Invention

The present invention relates to an advertisement distribution apparatus and an advertisement distribution method.

2. Description of the Related Art

In the related art, a free viewpoint video technique of generating a 3D model based on data imaged by imaging units disposed at a plurality of viewpoint positions so that a video of a designated arbitrary viewpoint position can be viewed is known.

The free viewpoint video technique proposes a technique of displaying advertisement information on free viewpoint video which is video of an arbitrary viewpoint position in order to advertise a product or a service, for example (see Japanese Laid-open Patent Publication No. 2012-048639).

However, the conventional free viewpoint video technique can just display advertisement information but cannot display advertisement information effectively. Free viewpoint video is viewed by a different number of users and provides different characteristics depending on a viewpoint position, a viewing direction, and the like. Thus, it is desirable to distribute advertisement information effectively according to the viewpoint position, the viewing direction, and the like.

SUMMARY OF THE INVENTION

According to the exemplary embodiment, an advertisement distribution apparatus includes a receiver, an advertisement space setting unit, an advertisement information setting unit, and a video transmitter. The receiver receives a display request including a viewpoint condition and advertisement information. The advertisement space setting unit sets an advertisement space corresponding to the viewpoint condition to video data of an arbitrary viewpoint position generated based on imaging data having different viewpoint positions. The advertisement information setting unit sets the advertisement information received by the receiver to the advertisement space set by the advertisement space setting unit. The video transmitter transmits the video data of the arbitrary viewpoint position in which the advertisement information is set in the advertisement space to a terminal device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a diagram illustrating an example of an advertisement setting information table;

FIG. 6 is a diagram illustrating an example of an advertisement space setting table;

FIG. 13 is a flowchart of a second distribution data generating process illustrated in FIG. 11.

DETAILED DESCRIPTION OF THE PREFERRED EMBODIMENTS

Hereinafter, an advertisement distribution apparatus and an advertisement distribution method according to an exemplary embodiment (hereinafter referred to as an "embodiment") of the invention will be described in detail with reference to the accompanying drawings. The advertisement distribution apparatus and the advertisement distribution method according to the invention are not limited to the embodiment.

1. Configuration of Advertisement Distribution System

Figure 1:
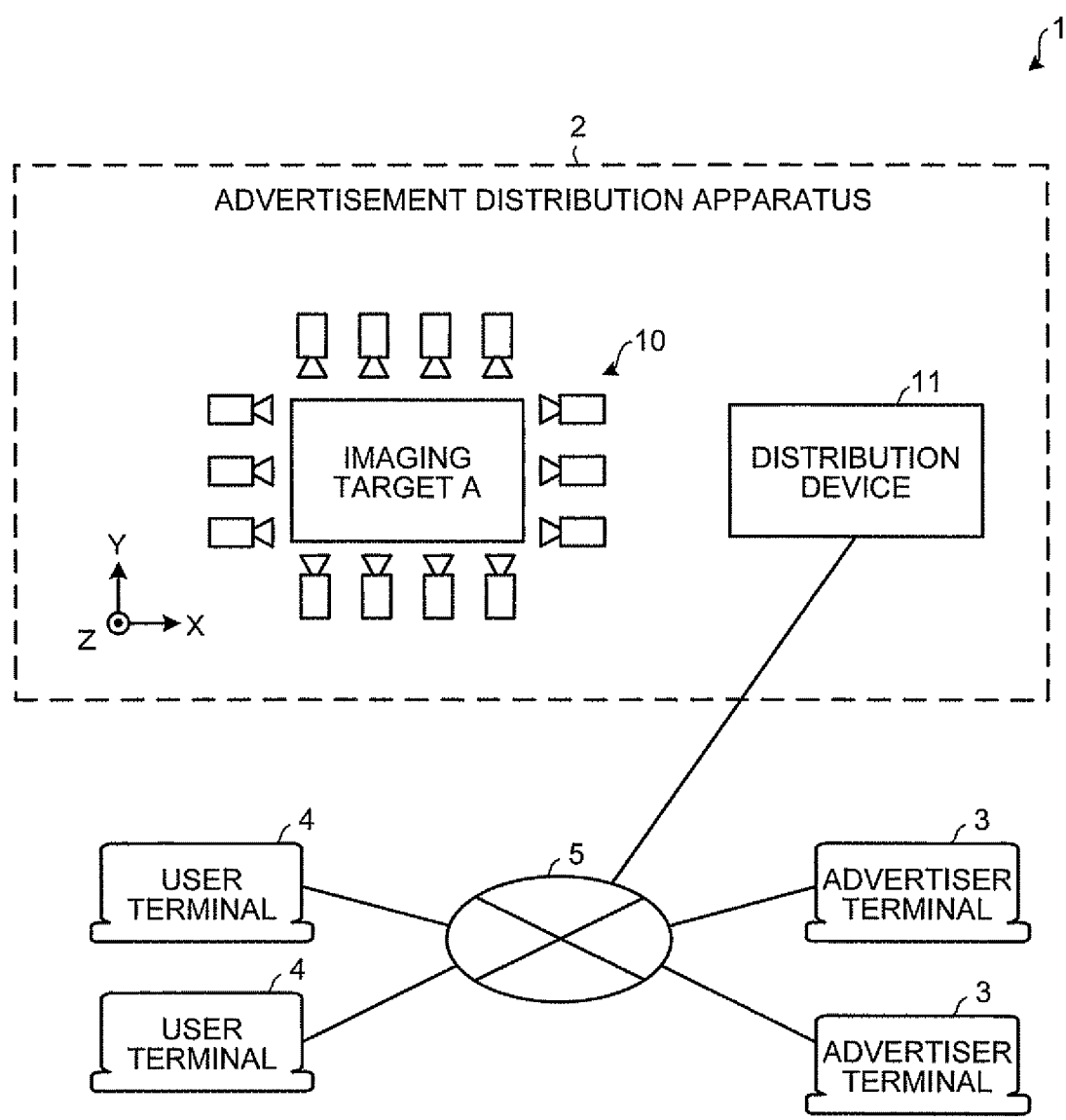
FIG. 1 is a diagram illustrating the configuration of an advertisement distribution system according to an embodiment.

FIG. 1 is a diagram illustrating the configuration of an advertisement distribution system according to an embodiment. As illustrated in FIG. 1, a advertisement distribution system 1 includes an advertisement distribution apparatus 2, a plurality of advertiser terminals 3, and a plurality of user terminals 4. The advertisement distribution apparatus 2 is communicably connected to the advertiser terminals 3 and the user terminals 4 via a network 5.

The advertisement distribution apparatus 2 generates free viewpoint video of an imaging target A, adds advertisement information provided from the advertiser terminal 3 to an advertisement space set in the free viewpoint video, and provides the free viewpoint video to the user terminal 4. The free viewpoint video allows users to freely select a viewpoint position, a viewing direction, and a view angle, and the user of the user terminal 4 can view a video of an arbitrary viewpoint position which is a video of desired viewpoint position, viewing direction, and view angle among the video of the imaging target A.

The advertiser terminal 3 is a terminal device of an advertiser that sets an advertisement distributed by the advertisement distribution apparatus 2, and for example, is a personal computer, a dedicated computer, or the like. Moreover, the user terminal 4 is a terminal device of a user that views the free viewpoint video provided by the advertisement distribution apparatus 2, and for example, is a personal computer, a dedicated computer, or the like.

The advertisement distribution apparatus 2 includes a plurality of imaging devices 10 and a distribution device 11. The imaging devices 10 are disposed at different viewpoint positions with respect to the imaging target A and outputs imaged video data of the respective areas of the imaging target A to the distribution device 11. The video data output from the imaging device 10 is moving-picture data of 30 frames per sec, for example.

The distribution device 11 generates a polygonal (for example, a rectangular polygonal) 3D model based on the video data (hereinafter sometimes referred to as imaging data) output from the plurality of imaging devices 10. Moreover, the distribution device 11 generates free viewpoint video by mapping textures onto the 3D model and provides the free viewpoint video to the user terminal 4 that has issued a display request.

Upon receiving a display request including advertisement information from the advertiser terminal 3, the distribution device 11 sets advertisement information to an advertisement space. The display request from the advertiser terminal 3 includes a viewpoint condition, and the distribution device 11 sets advertisement information to an advertisement space corresponding to the viewpoint condition.

The viewpoint condition is specifically the condition of a viewpoint position, a viewing direction, and a view angle, and the distribution device 11 sets an advertisement space to a video corresponding to the viewpoint position, viewing direction, and view angle designated by the display request. Moreover, the distribution device 11 sets advertisement information included in the display request to the advertisement space.

The user terminal 4 can acquire a video of an arbitrary viewpoint position among the video of the imaging target A from the distribution device 11 by designating a viewpoint condition. When the advertisement space is included in the video corresponding to the designated viewpoint condition, the distribution device 11 sends video data of the arbitrary viewpoint position in which advertisement information is set to the advertisement space to the user terminal 4 via the network 5. In this manner, the user terminal 4 can view the video of the imaging target A including the advertisement information.

Since the free viewpoint video is viewed by a different number of users and provides different characteristics depending on a viewpoint position, a viewing direction, and the like, it is possible to distribute advertisement information effectively by displaying advertisement information in the advertisement space in which the viewpoint condition is set. Hereinafter, the advertisement distribution apparatus 2 will be described in further detail.

2. Configuration of Advertisement Distribution Apparatus

Figure 2:
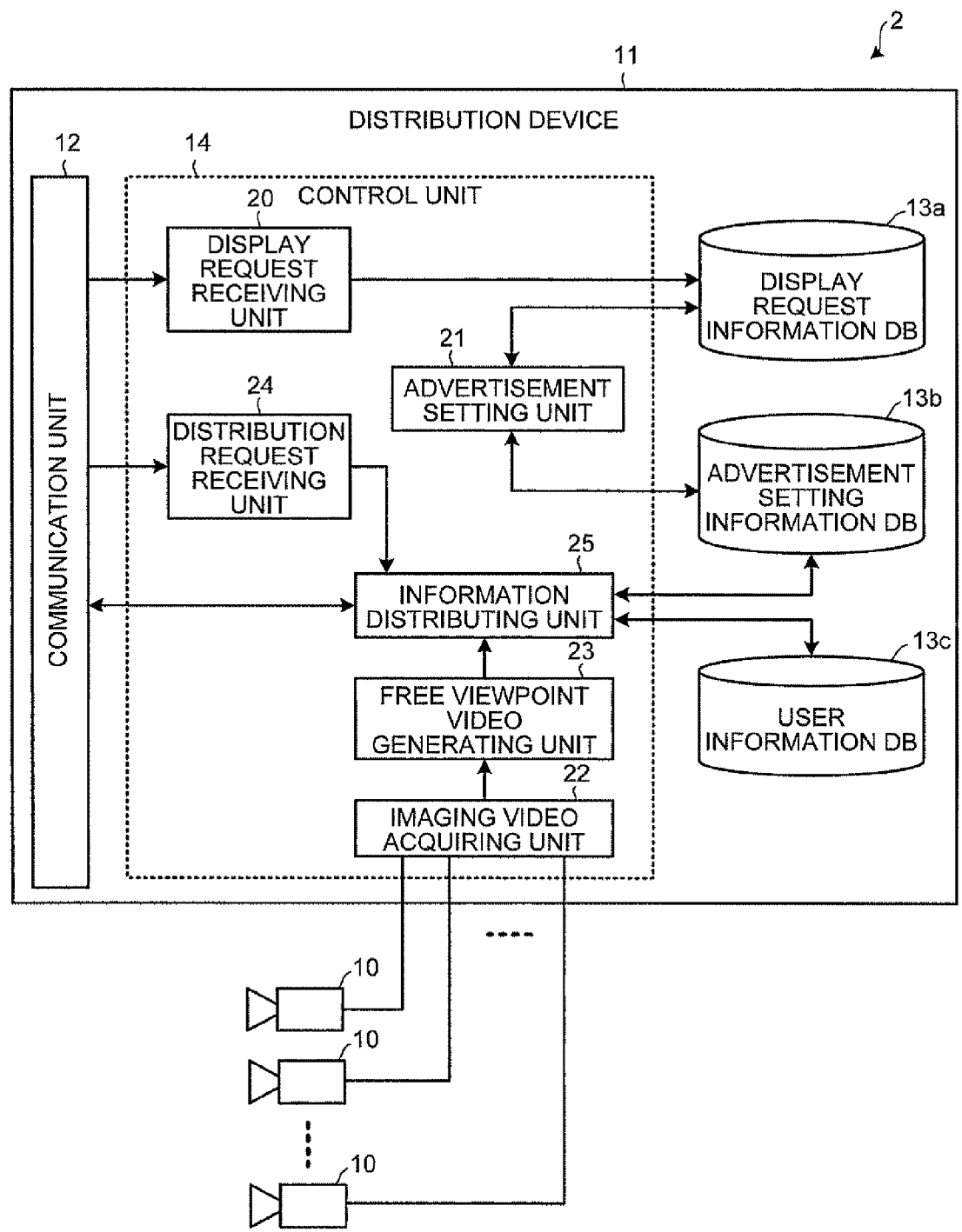
FIG. 2 is a diagram for explaining the configuration of an advertisement distribution apparatus according to the embodiment.

The configuration of the advertisement distribution apparatus 2 will be described in detail. FIG. 2 is a diagram illustrating a configuration example of the advertisement distribution apparatus 2 according to the embodiment. As illustrated in FIG. 2, the advertisement distribution apparatus 2 includes a communication unit 12, a display request information database 13a, an advertisement setting information database 13b, a user information database 13c, and a control unit 14. Hereinafter, the database will be referred to as a DB.

The communication unit 12 is connected to the network 5 and transmits and receives information to and from the advertiser terminal 3 and the user terminal 4 via the network 5. The communication unit 12 is connected to the network 5 via cables or radio waves.

The display request information DB 13a, the advertisement setting information DB 13b, and the user information DB 13c are semiconductor memory devices such as random access memory (RAM) or flash memory or storage devices such as a hard disk or an optical disc, for example. The display request information DB 13a stores a display request information table, advertisement information, and the like, the advertisement setting information DB 13b stores an advertisement setting information table described later or the like, and the user information DB 13c stores user attribute information or the like.

The control unit 14 is realized as an integrated circuit such as an application specific integrated circuit (ASIC) or a field programmable gate array (FPGA). Moreover, the control unit 14 is realized, for example, when a central processing unit (CPU), a micro processing unit (MPU), or the like executes a program stored in an internal storage device using RAM as a work area.

The control unit 14 includes a display request receiving unit 20, an advertisement setting unit 21, an imaging video acquiring unit 22, a free viewpoint video generating unit 23, a distribution request receiving unit 24, and an information distributing unit 25. The control unit 14 realizes or executes the function or effect of information processing described later. The internal configuration of the control unit 14 is not limited to the above configuration, and another configuration may be employed if the control unit 14 can perform the information processing described later.

The display request receiving unit 20 corresponds to an example of a "receiver" and the advertisement setting unit 21 corresponds to an example of an "advertisement space setting unit." Moreover, the information distributing unit 25 corresponds to an example of an "advertisement information setting unit" and a "video transmitter."

Display Request Receiving Unit

The display request receiving unit 20 acquires a display request transmitted from the advertiser terminal 3 via the communication unit 12. The display request includes advertisement information, viewpoint condition information, payment amount information, and the like, for example. Examples of the advertisement information include 2D content or 3D content such as banner advertisements, text advertisements, or moving-picture advertisements, for example.

Moreover, the viewpoint condition includes condition of a viewpoint position, a viewing direction, and a view angle. The viewpoint position is defined by a coordinate position such as (x,y,z), for example, and the viewing direction is defined by a vector component such as (Vx,Vy,Vz), for example. Moreover, the view angle is defined by an angle of view, a zoom ratio, or the like, for example.

The display request receiving unit 20 sets information included in the display request received from the advertiser terminal 3 to a display request information table stored in the display request information DB 13a and stores the advertisement information included in the display request in the display request information DB 13a.

Figures 3, 4:
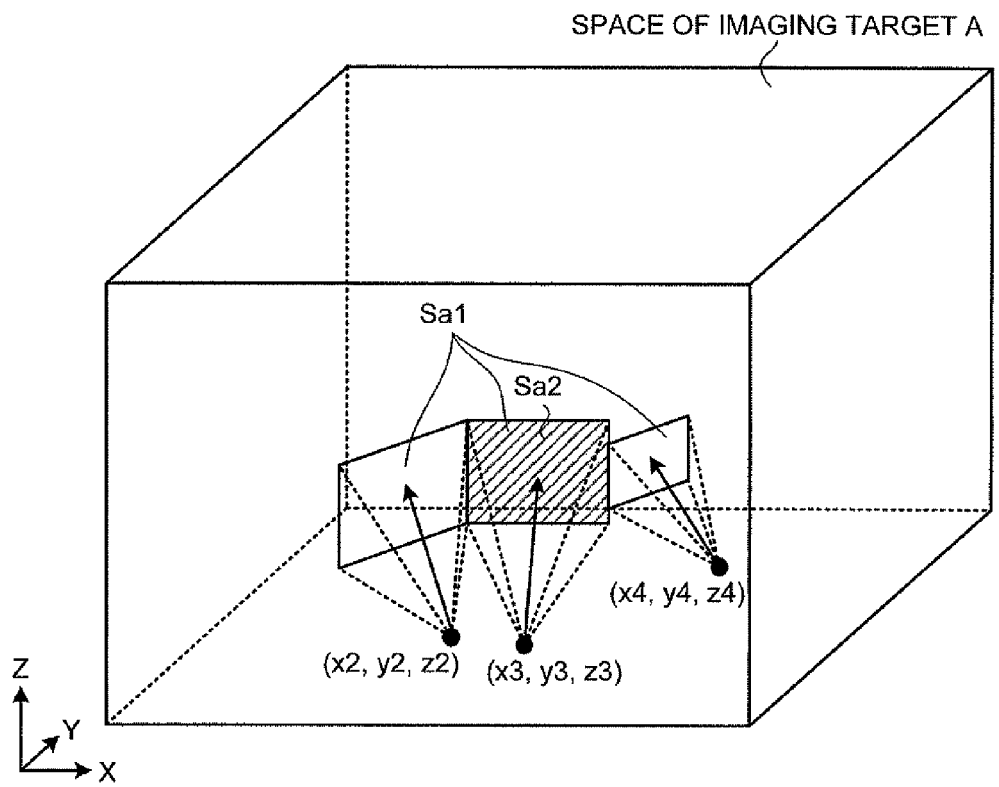
FIG. 3 is a diagram illustrating an example of a display request information table.
FIG. 4 is an explanatory diagram of a display range corresponding to an advertisement ID.

FIG. 3 is a diagram illustrating an example of the display request information table.

As illustrated in FIG. 3, information in which a viewpoint position, a viewing direction, a view angle, a payment amount, a display period, and an advertisement information storage location are correlated with an advertisement ID which is identification information allocated to each display request is included in the display request information table. The payment amount is information on the amount of money that an advertiser pays per unit time or per unit display range.

For example, a display request of advertisement ID "10001" indicates that the viewpoint condition includes a viewpoint position of "x1,y1,z1," a viewing direction of "Vx1,Vy1,Vz1," and a view angle of "60°," and that advertisement information is stored in a "/10001/ad1/" folder. Moreover, the display request indicates that the payment amount for the display request is "150 Yen" and the display period is "1 hour."

Moreover, a display request of advertisement ID "10002" indicates that the viewpoint condition includes a plurality of continuous viewpoint positions, viewing directions, and view angles. Specifically, the viewpoint condition indicates a continuous range that starts from an area defined by a viewpoint position of "x2,y2,z2," a viewing direction of "Vx2,Vy2,Vz2," and a view angle of "60°," that passes through an area defined by a viewpoint position of "x3,y3,z3," a viewing direction "Vx3,Vy3,Vz3," and a view angle of "60'," and that ends at an area defined by a viewpoint position of "x4,y4,z4," a viewing direction "Vx4,Vy4,Vz4," and a view angle of "30°." In this range of areas is displayed the advertisement information stored in the "/10001/ad2/" folder. The display request also indicates that the payment amount for the display request is "200 Yen" and the display period is "3 hours."

Advertisement Setting Unit

The advertisement setting unit 21 sets an advertisement space to the video data of the arbitrary viewpoint position based on the display request information table stored in the display request information DB 13a. Specifically, the advertisement setting unit 21 allocates advertisement spaces to advertisement IDs having such a viewpoint condition that advertisement display ranges do not overlap each other and sets advertisement spaces to advertisement IDs having such a viewpoint condition that the advertisement display ranges overlap each other so that an advertisement space is set to a display request having a higher payment amount preferentially than other display requests.

For example, as illustrated in FIG. 3, for advertisement IDs "10002" and "10003," the viewpoint position "x3,y3,z3" and the viewing direction "Vx3,Vy3,Vz3" are allocated, and the display ranges overlap each other. Moreover, the payment amount for the display request of advertisement ID "10002" is "200 Yen," and the payment amount for the display request of advertisement ID "10003" is "100 Yen." Thus, the advertisement setting unit 21 sets an advertisement space to the display request of advertisement ID "10002" preferentially to the other display request.

FIG. 4 is an explanatory diagram of display ranges corresponding to the advertisement IDs "10002" and "10003." As illustrated in FIG. 4, a display range Sa1 of the advertisement ID "10002" overlaps a display range Sa2 of the advertisement ID "10003." Although FIG. 4 illustrates a predetermined range of areas about a position located at a predetermined distance from a viewpoint position in a viewing direction as a display range for the sake of convenience, the display ranges Sa1 and Sa2 are defined by a so-called angle of view. For example, the display range Sa2 is an area within the range of the angle of view "±30° (60°)" about the viewing direction "Vx3,Vy3,Vz3" from the viewpoint position "x3,y3,z3."

The advertisement setting unit 21 sets the set advertisement space information to the advertisement setting information table of the advertisement setting information DB 13b. FIG. 5 is a diagram illustrating an example of the advertisement setting information table. As illustrated in FIG. 5, information in which a viewpoint position, a viewing direction, a view angle, and a remaining display period are correlated with an advertisement ID is included in the advertisement setting information table.

After an advertisement ID of which the remaining display period becomes "0" in the advertisement setting information table and the corresponding information are deleted, or when there is a range to which an advertisement space can be set, the advertisement setting unit 21 extracts information on an advertisement ID in a display range that is not set in the advertisement setting information table by referring to the display request information table and sets the information to the advertisement setting information table. In this case, when there is information of advertisement IDs of which the display ranges overlap each other, the advertisement setting unit 21 selects an advertisement ID having the highest payment amount and sets to the advertisement ID to the advertisement setting information table.

In this manner, the advertisement setting unit 21 sets advertisement information included in the display request to an advertisement space corresponding to the viewpoint condition defined in the display request received by the display request receiving unit 20. In this way, when the advertisement information set to the advertisement space is set to the advertisement space in the range designated from the user terminal 4, video data of an arbitrary viewpoint position in which the advertisement information is set is transmitted to the user terminal 4.

Moreover, the advertisement setting unit 21 may collect display requests from the advertiser terminal 3 for a predetermined period and determine an advertisement space that is set to the video data of an arbitrary viewpoint position by auction when there is information of advertisement IDs of which the viewpoint condition overlap each other.

In this case, for example, the advertisement distribution apparatus 2 stores an advertisement space setting table that defines a plurality of display spaces in the advertisement setting information DB 13b. FIG. 6 is a diagram illustrating an example of the advertisement space setting table. As illustrated in FIG. 6, information in which viewpoint condition information, lowest price information, and highest price information are correlated with each advertisement space ID which is identification information of an advertisement space is included in the advertisement space setting table. The viewpoint condition information includes a viewpoint position, a viewing direction, and a view angle.

The advertisement setting unit 21 sets an advertisement space defined based on the advertisement space setting table and collects display requests from the advertiser terminal 3 for a predetermined period by auction. In this case, the display request from the advertiser terminal 3 includes an advertisement space ID and a payment price corresponding to the viewpoint condition in addition to the advertisement information.

Moreover, when there is a plurality of display requests for the same advertisement space ID, the advertisement setting unit 21 determines advertisement information included in a display request having the highest payment price as advertisement information to be displayed in an advertisement space. Even if the predetermined period has not elapsed, when there is a display request in which a payment amount equal to or higher than the highest price defined in the advertisement space setting table is set, the advertisement setting unit 21 determines advertisement information included in the display request as advertisement information to be displayed in the advertisement space.

In the example illustrated in FIG. 6, although the viewpoint condition set in the advertisement space setting table is defined by a viewpoint position, a viewing direction, and a view angle, the definition of the viewpoint condition is not limited to these items of information. For example, when the imaging target A is a soccer field, an advertisement space may be set to an object that is set within or outside the field.

For example, a uniform of a soccer player present within the field may be set as the viewpoint condition, and a signboard area outside the field may be set as the viewpoint condition. In this case, the information distributing unit 25 extracts the uniform of a soccer player or the signboard area and sets the advertisement information. A predetermined color or a predetermined pattern, for example, may be set to the uniform of the soccer player so that the display area of the advertisement information can be detected easily. In this way, the information distributing unit 25 can easily extract the uniform.

Imaging Video Acquiring Unit

The imaging video acquiring unit 22 acquires video data output from the plurality of imaging devices 10 disposed at different viewpoint positions with respect to the imaging target A and outputs the video data to the free viewpoint video generating unit 23.

Free viewpoint Video Generating Unit

The free viewpoint video generating unit 23 generates video in such a range that the video is not imaged by the imaging devices 10 from the imaging data acquired by the imaging video acquiring unit 22 by a video interpolation process and generates a 3D model made up of a plurality of polygons (for example, rectangular polygons) based on these items of information.

Moreover, the free viewpoint video generating unit 23 extracts textures from the imaging data acquired by the imaging video acquiring unit 22 and generates free viewpoint video by mapping the textures onto the 3D model.

Distribution Request Receiving Unit

Figure 7:
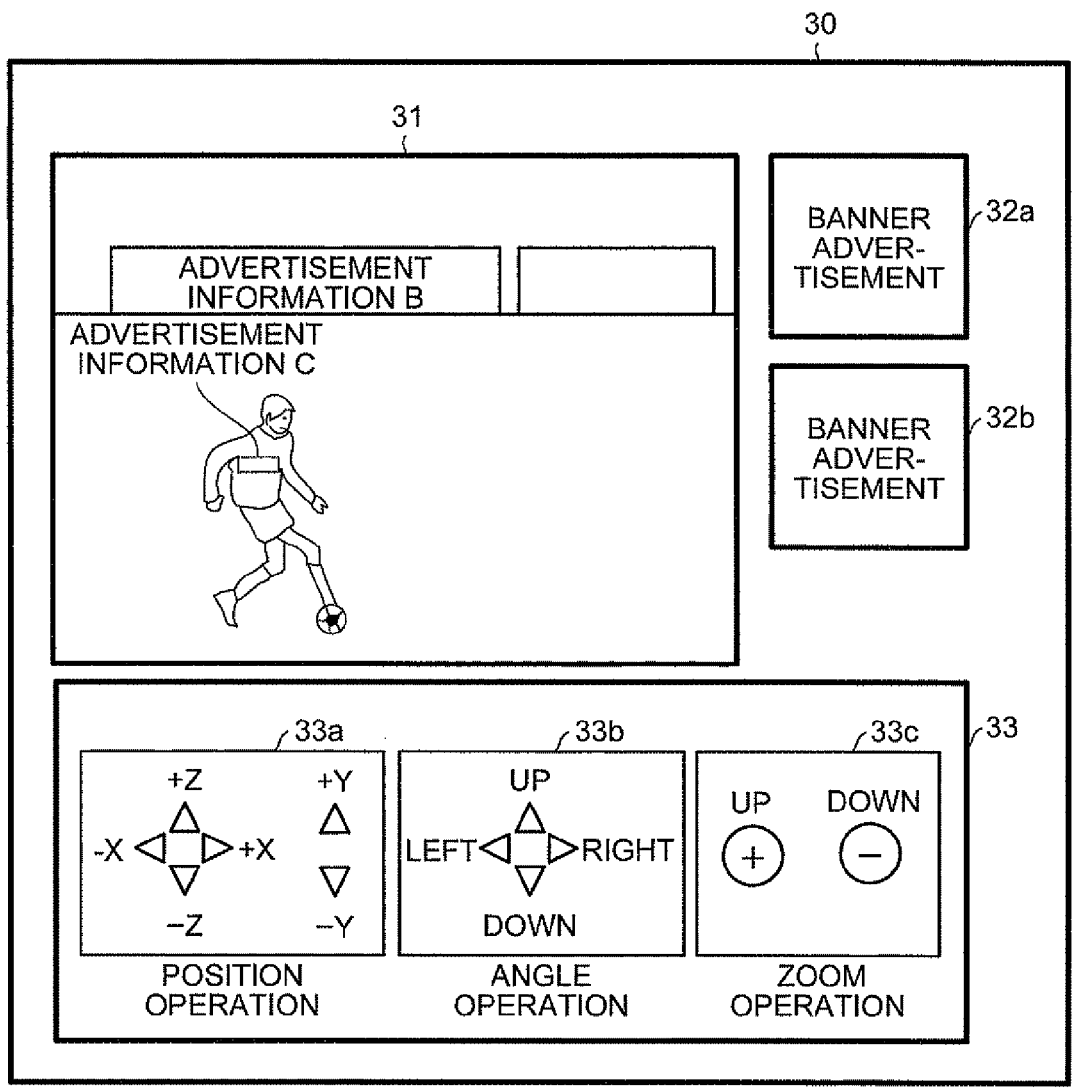
FIG. 7 is a diagram illustrating an example of an information distribution page.

The distribution request receiving unit 24 receives a distribution request from the user terminal 4 via the communication unit 12. The distribution request is transmitted from the user terminal 4 according to a user operation on the user terminal 4. For example, when the network 5 is an IF network like the Internet, a web page (hereinafter referred to as an information distribution page) for information distribution is transmitted from the information distributing unit 25 to the user terminal 4. FIG. 7 is a diagram illustrating an example of the information distribution page.

As illustrated in FIG. 7, a video display space 31 in which free viewpoint video is displayed, banner advertisement spaces 32a and 32b in which a banner advertisement is displayed, and an operation space 33 in which various operation buttons 33a, 33b, and 33c are disposed are set in a information distribution page 30.

The operation button 33a is a button for changing a viewpoint position, and the user of the user terminal 4 can change the viewpoint position in ±X, ±Y, and ±Z directions by operating the operation button 33a.

The operation button 33b is a button for changing a viewing direction from a viewpoint position, and the user of the user terminal 4 can change the viewing direction at the viewpoint position set by the operation button 33a by operating the operation button 33b.

The operation button 33c is a button for changing a zoom ratio, and the user of the user terminal 4 can change the view angle about the viewing direction from the viewpoint position set by the operation buttons 33a and 33b by operating the operation button 33c.

When the operation buttons 33a, 33b, and 33c are operated in the information distribution page 30, the control unit of the user terminal 4 transmits information on the viewpoint condition (hereinafter referred to as designated viewpoint condition) designated by the operations to the advertisement distribution apparatus 2 via the network 5. For example, the control unit of the user terminal 4 calculates a viewpoint position, a viewing direction, and a view angle from the user operations on the operation buttons 33a, 33b, and 33c and transmits these items of information to the advertisement distribution apparatus 2 as designated viewpoint condition information.

The control unit of the user terminal 4 may transmit the operation information to the advertisement distribution apparatus 2 whenever the user operates the operation buttons 33a, 33b, and 33c and allow the distribution request receiving unit 24 to calculate the designated viewpoint condition. In this case, the distribution request receiving unit 24 stores the viewpoint position, the viewing direction, and the view angle for each user and calculates the designated viewpoint condition based on the stored information and the information transmitted from the user terminal 4.

Upon receiving a distribution request from the user terminal 4, the distribution request receiving unit 24 outputs the designated viewpoint condition information corresponding to the distribution request to the information distributing unit 25. In this way, free viewpoint video data corresponding to the distribution request is distributed from the information distributing unit 25 to the user terminal 4.

Information Distributing Unit

Upon receiving designated viewpoint condition information from the distribution request receiving unit 24, the information distributing unit 25 acquires video data of an arbitrary viewpoint position corresponding to the designated viewpoint condition from the free viewpoint video generating unit 23. Moreover, the information distributing unit 25 acquires advertisement information corresponding to the designated viewpoint condition from the display request information DB 13a based on the advertisement setting information table. The acquisition of the advertisement information from the display request information DB 13a is performed by referring to the display request information table based on the advertisement ID corresponding to the designated viewpoint condition.

Moreover, the information distributing unit 25 generates video data of an arbitrary viewpoint position in which advertisement information is set to an advertisement space by setting the advertisement information acquired from the display request information DB 13a to the video data acquired from the free viewpoint video generating unit 23 and transmits the video data to the user terminal 4.

Figure 8:
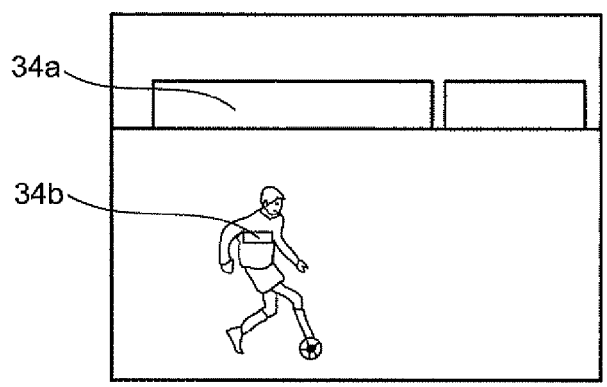
FIG. 8 is a diagram illustrating an example of video data generated by a free viewpoint video generating unit.

For example, it is assumed that the information distributing unit 25 acquires video data as illustrated in FIG. 8 from the free viewpoint video generating unit 23 as video data corresponding to designated viewpoint condition and advertisement spaces 34a and 34b are set at the positions illustrated in FIG. 8 based on the advertisement setting information table. FIG. 8 is a diagram illustrating an example of video data generated by the free viewpoint video generating unit 23. In the example illustrated in FIG. 8, as illustrated in the video display space 31 of FIG. 7, advertisement information B corresponding to the advertisement space 34a and advertisement information C corresponding to the advertisement space 34b are set.

As described above, when the imaging target A (see FIG. 1) is a soccer field, the information distributing unit 25 identifies objects (for example, a signboard area or the uniform of a soccer player) set in the advertisement space setting table among the objects appearing in free viewpoint video, for example. The information distributing unit 25 stores dictionary data regarding the feature vector of an object and the information on the advertisement space ID and extracts objects corresponding to a display space of an advertisement space ID based on the dictionary data. Examples of the feature vectors include a contour, the number of colors used, and the like.

Figure 9A:
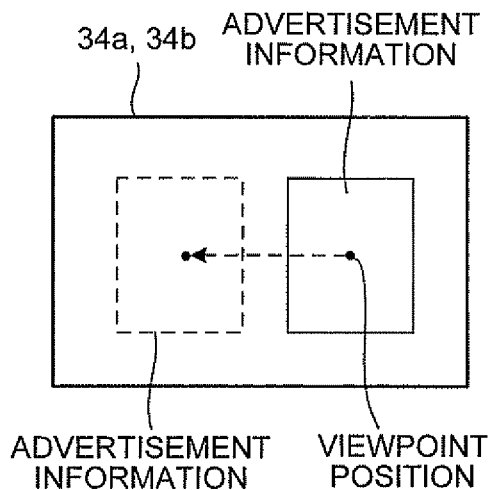
FIGS. 9A and 9B are explanatory diagrams of the layout of advertisement information in an advertisement space.

Moreover, the information distributing unit 25 may set the advertisement information so that the advertisement information is displayed on the entire advertisement spaces 34a and 34b or the advertisement information is displayed on a part of the advertisement spaces 34a and 34b. FIGS. 9A and 95 are explanatory diagrams of the layout of the advertisement information in the advertisement spaces 34a and 34b.

When the advertisement information is set to a part of the advertisement spaces 34a and 34b, the information distributing unit 25 may display advertisement information near the center of the viewpoint condition from the user terminal 4 as illustrated in FIG. 9A. By doing so, the user of the user terminal 4 can see the advertisement information near the center of the free viewpoint video. As a result, it is possible to improve the advertisement effect.

Figure 9B:
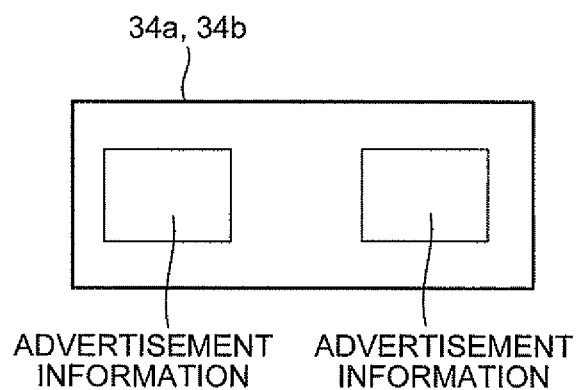

Moreover, as illustrated in FIG. 9B, the information distributing unit 25 can set a plurality of items of same advertisement information to a plurality of portions in the advertisement spaces 34a and 34b. By doing so, the user of the user terminal 4 can repeatedly see the advertisement information. As a result, it is possible to improve the advertisement effect.

Moreover, instead of the information distributing unit 25, the free viewpoint video generating unit 23 may generate video data of an arbitrary viewpoint position in which advertisement information is set to an advertisement space. In this case, the free viewpoint video generating unit 23 generates an advertisement space as a 3D model, for example, combines the advertisement space with a 3D model based on the imaging data, and map advertisement information onto the advertisement space of the combined 3D model as textures to thereby generate free viewpoint video.

Moreover, the information distributing unit 25 acquires attribute information (for example, gender, age, address, preference, or the like) of the user of the user terminal 4 from the user information DB 13c, acquires banner advertisement information corresponding to the attribute information via the network 5, and distributes the information to the user terminal 4. The control unit of the user terminal 4 displays the banner advertisement information acquired from the advertisement distribution apparatus 2 in the banner advertisement spaces 32a and 32b as illustrated in FIG. 7, for example. In this manner, it is possible to set advertisements corresponding to the user attributes of the user terminal 4 in the information distribution page 30.

A banner information table that correlates banner advertisement information and user attribute information may be set in the user information DB 13c as condition for distributing a banner advertisement, and the banner advertisement information may be transmitted to the user terminal 4 based on the banner information table.

3. Process Flow of Advertisement Distribution Apparatus

Next, information processing of the control unit 14 of the advertisement distribution apparatus 2 according to the embodiment will be described with reference to FIGS. 10 to 12.

Advertisement Setting Process

An example of an advertisement setting process will be described with reference to FIG. 10. FIG. 10 is a flowchart of an advertisement setting process of the advertisement distribution apparatus 2. In this advertisement setting process, an example where an advertisement space is set by auction is illustrated.

Figure 10:
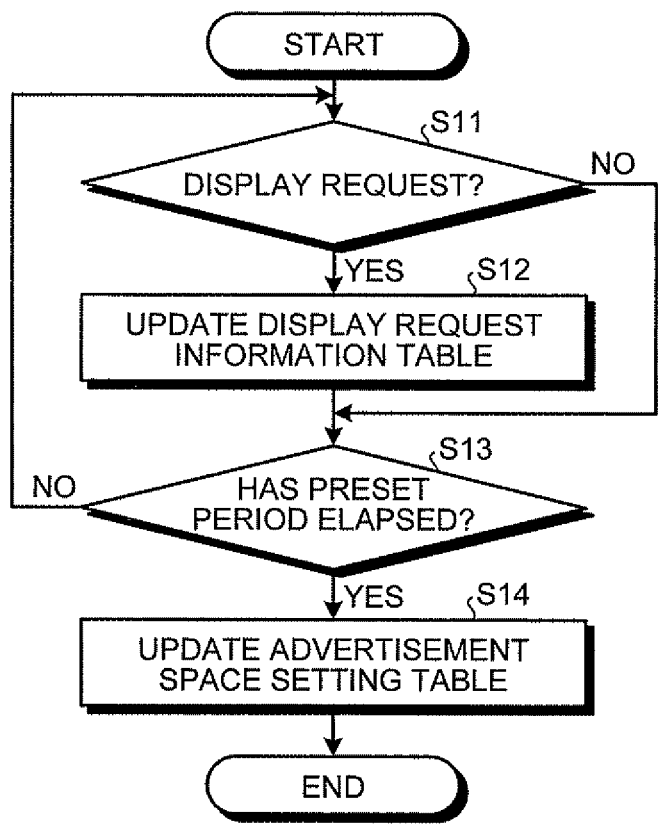
FIG. 10 is a flowchart of information processing in the advertisement distribution apparatus according to the embodiment.

In the advertisement setting process, as illustrated in FIG. 10, the control unit 14 determines whether a display request is acquired from the advertiser terminal 3 via the communication unit 12 (step S11). When it is determined that the display request is acquired (Yes in step S11), the control unit 14 allocates a new advertisement ID to the display request and adds information included in the display request to the display request information table so as to correspond to the newly allocated advertisement ID. In this manner, the display request information table is updated (step S12). The display request includes advertisement information, viewpoint condition information, and payment amount information, for example. The advertisement information included in the display request is stored in the display request information DB 13a.

Subsequently, the control unit 14 determines whether a preset period has elapsed (step S13). The preset period is a bidding period in auction and is a period for collecting display requests. When the imaging target A is a soccer field, the preset period may be a period 10 minutes before the start of a match.

When it is determined that the present period has not elapsed (No in step S13), the control unit 14 proceeds to step S11. On the other hand, when it is determined that the preset period has elapsed (Yes in step S13), the control unit 14 updates the advertisement space setting table (step S14).

Specifically, the control unit 14 allocates advertisement spaces to advertisement IDs of which the viewpoint condition do not overlap each other and sets advertisement spaces to advertisement IDs of which the viewpoint condition overlap each other so that an advertisement space is set to a display request having a higher payment amount preferentially than the other display requests. When the process of step S14 ends, the control unit 14 terminates the advertisement setting process.

Video Distribution Process

Next, an example of a video distribution process will be described with reference to FIG. 11. FIG. 11 is a flowchart of the video distribution process by the control unit 14 of the advertisement distribution apparatus 2.

Figure 11:
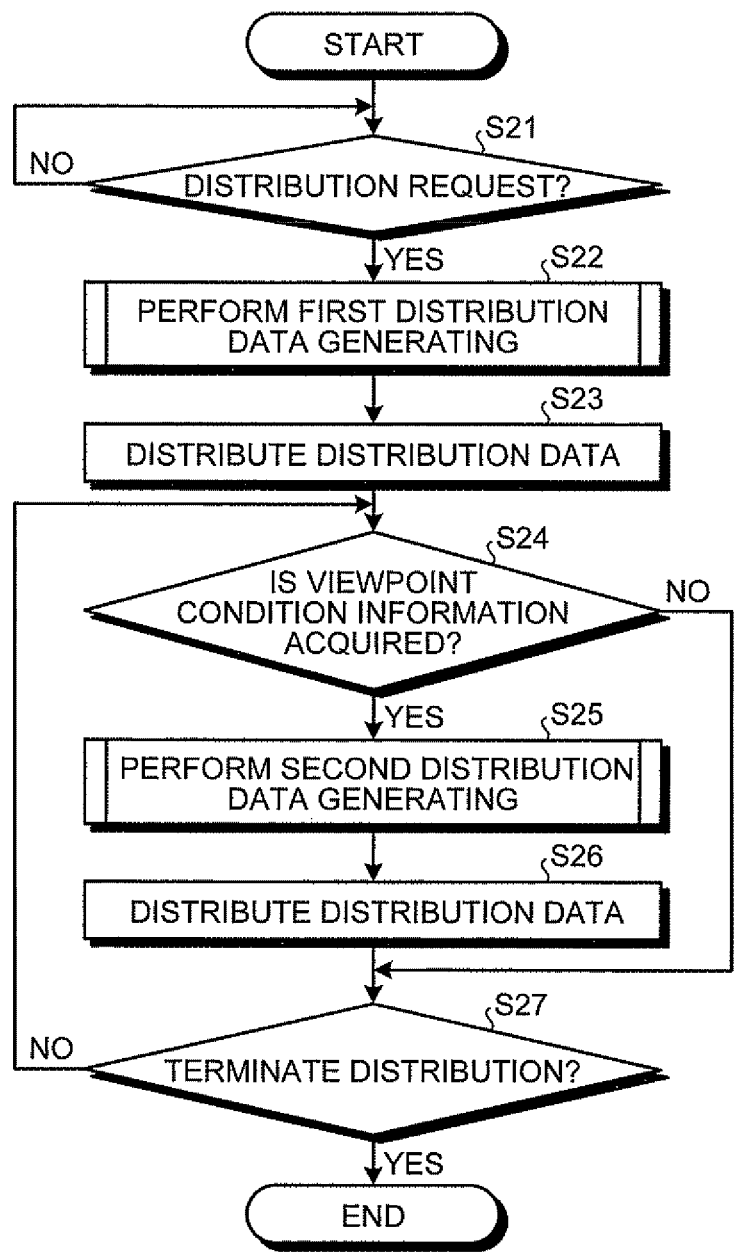
FIG. 11 is a flowchart of a video distribution process in the advertisement distribution apparatus according to the embodiment.

In the video distribution process, as illustrated in FIG. 11, the control unit 14 determines whether there is a distribution request from the user terminal 4 (step S21). When it is determined that there is a distribution request from the user terminal 4 (Yes in step S21), the control unit 14 performs a first distribution data generating process for default viewpoint condition (step S22). The first distribution data generating process is a process of steps S31 to S34 illustrated in FIG. 12, which will be described later.

Subsequently, the control unit 14 transmits the distribution data generated in step S22 to the user terminal 4 (step S23). The distribution data is data for generating the information distribution page 30 illustrated in FIG. 7, for example, and is displayed in the information distribution page 30 of the user terminal 4.

Subsequently, the control unit 14 determines whether viewpoint condition information is acquired from the user terminal 4 (step S24). When it is determined that the viewpoint condition information is acquired from the user terminal 4 (Yes in step S24), the control unit 14 performs a second distribution data generating process for the acquired viewpoint condition information (step S25). The second distribution data generating process is a process of steps S41 to S44 illustrated in FIG. 13, which will be described later.

Subsequently, the control unit 14 transmits the distribution data generated in step S24 to the user terminal 4 (step S26). The distribution data is video data set to the video display space 31 of FIG. 7, for example, and is displayed in the video display space 31 of the user terminal 4.

When it is determined in step S24 that the viewpoint condition information is not acquired from the user terminal 4 (No in step S24) after step S26 ends, the control unit 14 determines whether or not to terminate the distribution to the user terminal 4 (step S27).

In this process, the control unit 14 determines to terminate the distribution to the user terminal 4 when a communication link between the user terminal 4 and the advertisement distribution apparatus 2 is disconnected or when an end button (not illustrated) of the user terminal 4 is operated. When it is determined not to terminate the distribution to the user terminal 4 (No in step S27), the control unit 14 proceeds to step S24. On the other hand, when it is determined to terminate the distribution to the user terminal 4 (Yes in step S27), the control unit 14 terminates the video distribution process to the user terminal 4.

Next, the first distribution data generating process of step S22 illustrated in FIG. 11 will be described. FIG. 12 is a flowchart of the first distribution data generating process.

Figure 12:
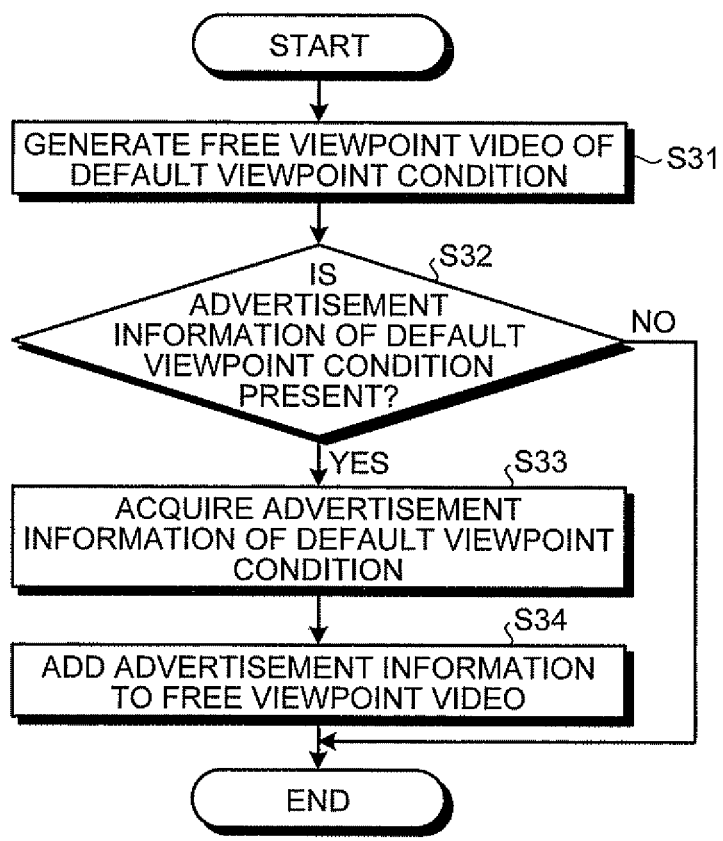
FIG. 12 is a flowchart of a first distribution data generating process illustrated in FIG. 11.

As illustrated in FIG. 12, in the first distribution data generating process, free viewpoint video corresponding to default viewpoint condition is generated (step S31). The default viewpoint condition is stored in advance in the advertisement setting information DB 13b, and the control unit 14 acquires the same from the advertisement setting information DB 13b. The control unit 14 generates free viewpoint video corresponding to the default viewpoint condition acquired from the advertisement setting information DB 13b.

The advertisement setting unit 21 can selectively set viewpoint condition of a display request having the highest payment amount, viewpoint condition that enable a largest number of items of advertisement information can be seen, viewpoint condition of a display request corresponding to advertisement information of which the period displayed per unit time is smallest, and the like, for example, as the default viewpoint condition by referring to the advertisement setting information table.

The control unit 14 may store viewpoint condition corresponding to the user attributes of the user terminal 4 in advance in the user information DB 13c and set viewpoint condition corresponding to the user attributes as the default viewpoint condition. In this case, a default viewpoint information table that correlates viewpoint condition information with user attribute information may be set in the user information DB 13c, and the control unit 14 may generate free viewpoint video corresponding to the viewpoint condition corresponding to the user attributes of the user terminal 4 based on the default viewpoint information table.

In this manner, free viewpoint video of the viewpoint condition corresponding to the user attributes can be distributed in response to an initial access from the user terminal 4, and free viewpoint video corresponding to preferable viewpoint condition can be distributed to each user from the beginning. Thus, it is possible to increase the user's accesses to the advertisement distribution apparatus 2 and to improve the profitability or the like of an advertisement distribution service.

Subsequently, the control unit 14 determines whether advertisement information at an advertisement space position corresponding to the default viewpoint condition acquired from the advertisement setting information DB 13b is set in the advertisement setting information table of the advertisement setting information DB 13b (step S32).

When it is determined that the advertisement information at the advertisement space position corresponding to the default viewpoint condition is set (Yes in step S32), the control unit 14 acquires the advertisement information at the advertisement space position corresponding to the default viewpoint condition from the advertisement setting information DB 13b (step S33). Moreover, the control unit 14 adds the acquired advertisement information to the advertisement space position of the free viewpoint video generated in step S31 (step S34).

When it is determined in step S32 that advertisement information at the advertisement space position corresponding to the default viewpoint condition is not set (No in step S32), or when the process of step S34 ends, the control unit 14 terminates the first distribution data generating process.

Next, the second distribution data generating process of step S25 illustrated in FIG. 11 will be described. FIG. 13 is a flowchart of the second distribution data generating process.

As illustrated in FIG. 13, in the second distribution data generating process, free viewpoint video corresponding to designated viewpoint condition designated by the user of the user terminal 4 is generated (step S41). The designated viewpoint condition is viewpoint condition designated by the user of the user terminal 4 operating on the operation buttons 33a, 33b, and 33c, and the control unit 14 generates free viewpoint video based on the viewpoint condition information acquired from the user terminal 4.

Subsequently, the control unit 14 determines whether advertisement information at an advertisement space position corresponding to the designated viewpoint condition is set in the advertisement setting information table of the advertisement setting information DB 13b (step S42).

When it is determined that the advertisement information at the advertisement space position corresponding to the designated viewpoint condition is set (Yes in step S42), the control unit 14 acquires advertisement information at the advertisement space position corresponding to the designated viewpoint condition from the advertisement setting information DB 13b (step S43). Moreover, the control unit 14 adds the acquired advertisement information to the advertisement space position of the free viewpoint video generated in step S41 (step S44).

When it is determined in step S42 that the advertisement information at the advertisement space corresponding to the designated viewpoint condition is not set (No in step S42), or when the process of step S44 ends, the control unit 14 terminates the second distribution data generating process.

4. Modifications

In the above embodiment, although the control unit 14 of the advertisement distribution apparatus 2 generates and distributes moving-picture data of free viewpoint video based on imaging data of a moving picture obtained by imaging in real-time the imaging target A using the plurality of imaging devices 10, the invention is not limited to this. For example, the control unit 14 may generate and distribute moving-picture data of free viewpoint video based on imaging data imaged in advance by the imaging device 10.

Moreover, for example, the control unit 14 may generate and distribute a still-image data of free viewpoint video based on imaging data imaged by the imaging device 10 when a distribution request is received from the user terminal 4.

Moreover, in the above embodiment, although the viewpoint condition are designated based on the user operation on the operation buttons 33a, 33b, and 33c set in the information distribution page 30, designation of the viewpoint condition is not limited to this. For example, the control unit of the user terminal 4 may determine viewpoint condition information based on operations (movement of a mouse or rotation of a wheel) on a wheel mouse and the movement or the like of a mouse cursor in the video display space 31 and may transmit the determination results to the advertisement distribution apparatus 2 as the viewpoint condition information.

Moreover, in the above embodiment, although the advertisement information is displayed in the video display space 31, the control unit 14 may further add link information to the advertisement information. In this case, when the user of the user terminal 4 designates advertisement information displayed in the video display space 31 using a mouse or the like, the control unit of the user terminal 4 may acquire and display a page corresponding to the link from the web site of an advertiser via the network 5.

Moreover, in the above embodiment, although an example in which the advertisement information set in the advertisement spaces 34a and 34b (see FIGS. 8 and 9) is not associated with the viewpoint condition information transmitted from the user terminal 4, the invention is not limited to this. For example, the control unit 14 may set the advertisement information set in the advertisement spaces 34a and 34b so as to be associated with the viewpoint condition information.

Specifically, the control unit 14 may set a banner advertisement associated with advertisement information included in free viewpoint video that is generated based on the viewpoint condition information designated from the user terminal 4 to the advertisement spaces 34a and 34b. The banner advertisement associated with the advertisement information is a banner advertisement of the same advertiser or an associated advertiser. By doing so, the banner advertisement associated with the advertisement information included in the free viewpoint video can be displayed in the advertisement spaces 34a and 34b. By displaying a plurality of items of associated advertisement information in the free viewpoint video and near the free viewpoint video, it is possible to further improve the advertisement effect.

Moreover, in the above embodiment, although a display period is set as a display limitation, the number of display times rather than the display period may be set as the display limitation and both the display period and the number of display times may be set as the display limitation.

Moreover, in the above embodiment, although a specific viewpoint condition is allocated to each item of advertisement information, the allocation of viewpoint condition to advertisement information is not limited to this. For example, the control unit 14 may determine viewpoint condition in descending order of the frequency and period in which advertisement information is viewed by a user among the viewpoint condition of the free viewpoint video and may allocate advertisement information of display requests in descending order of payment amount. By allocating the viewpoint condition according to the payment amount in this manner, it is possible to distribute advertisements according to the payment amount.

In the above embodiment, although the display request from the advertiser terminal 3 includes viewpoint condition and advertisement information, the advertisement information and the viewpoint condition may not be transmitted from the advertiser terminal 3 to the advertisement distribution apparatus 2 simultaneously, and it is sufficient that the viewpoint condition and the advertisement information are finally acquired by a advertisement distribution apparatus 2b. Moreover, the advertisement information may not be an advertisement target itself, and for example, may be link information to advertisement target information.

5. Effect

As described above, in the advertisement distribution apparatus 2 according to the embodiment, the distribution request receiving unit 24 (corresponding to an example of a receiver) receives a display request including viewpoint condition and advertisement information. The advertisement setting unit 21 (corresponding to an example of an advertisement space setting unit) sets an advertisement space corresponding to viewpoint condition to video data of an arbitrary viewpoint position generated based on imaging data having different viewpoint positions. The information distributing unit 25 (corresponding to an example of an advertisement information setting unit) sets advertisement information received by the distribution request receiving unit 24 to the advertisement space set by the advertisement setting unit 21. The information distributing unit 25 (corresponding to an example of a video transmitter) transmits video data of the arbitrary viewpoint position in which the advertisement information is set to the advertisement space to the user terminal 4 (corresponding to an example of a terminal device).

In this manner, in the advertisement distribution apparatus 2 according to the embodiment, the advertisement space is set to the video data of the arbitrary viewpoint position generated based on the imaging data having different viewpoint positions, and the advertisement information received by the distribution request receiving unit 24 is set to the advertisement space. Thus, it is possible to distribute advertisement information effectively according to the characteristics of the free viewpoint video. The free viewpoint video is viewed by a different number of users and provides different characteristics depending on a viewpoint position, a viewing direction, and the like. Thus, it is possible to distribute advertisement information effectively by setting the advertisement space according to the viewpoint position, the viewing direction, and the like.

Moreover, in the advertisement distribution apparatus 2 according to the embodiment, payment amount information is included in the display request, and when a plurality of display requests received by the distribution request receiving unit 24 overlap each other, the advertisement setting unit 21 sets a display request having a higher payment amount to the advertisement space preferentially than the other display requests.

In this manner, in the advertisement distribution apparatus 2 according to the embodiment, since a display request having a higher payment amount is set to the advertisement space preferentially than the other display requests, the payment amount to the advertisement space becomes appropriate, and it is possible to improve the profit of the owner of the advertisement distribution apparatus 2. For example, since values are different depending on viewpoint condition, it is possible to dynamically determine an advertisement space for a display request having a payment amount that is appropriate for the value.

Moreover, in the advertisement distribution apparatus 2 according to the embodiment, the viewpoint condition includes viewpoint position information and viewing direction information. In this way, it is possible to set the display position of the advertisement information in detail and to effectively distribute advertisements.

Moreover, in the advertisement distribution apparatus 2 according to the embodiment, the viewpoint condition includes a plurality of continuous viewpoint positions and viewing directions. In this way, it is possible to set the display position of the advertisement information continuously and to effectively distribute advertisements.

Moreover, in the advertisement distribution apparatus 2 according to the embodiment, the advertisement setting unit 21 sets the advertisement space to an object appearing in video. In this way, for example, when the imaging target A is a soccer field, it is possible to set the advertisement space to an object that is set within or outside the field and to further improve the advertisement effect.

According to an aspect of the embodiment, it is possible to provide an advertisement distribution apparatus and an advertisement distribution method capable of distributing advertisements effectively.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An advertisement distribution apparatus comprising:
   a first receiver that receives first requests from a first terminal device for setting an advertisement space, the first requests each including a viewpoint condition and advertisement information;
   an advertisement space setting unit that sets an advertisement space corresponding to the viewpoint condition of each of the first requests received by the first receiver to video data of an arbitrary viewpoint position generated based on imaging data having different viewpoint positions;
   a second receiver that receives a second request from a second terminal device differing from the terminal device for transmitting the video data of the arbitrary viewpoint position, the second request differing from the first requests and including information about a viewpoint condition;
   an advertisement information setting unit that sets, to an advertisement space corresponding to the viewpoint condition specified by the second request among the advertisement spaces set by the advertisement space setting unit, the advertisement information which is included in the first request the viewpoint condition of which corresponds to the advertisement space corresponding to the viewpoint condition specified by the second request; and
   a video transmitter that transmits the video data of the arbitrary viewpoint position in which the advertisement information is set in the advertisement space to the second terminal device.

2. The advertisement distribution apparatus according to claim 1, wherein
   the display request includes payment amount information, and
   when a plurality of display requests received by the receiver overlap each other, the advertisement space setting unit sets a display request having a higher payment amount to the advertisement space preferentially than the other display requests.

3. The advertisement distribution apparatus according to claim 1, wherein
   the viewpoint condition includes viewpoint position information and viewing direction information.

4. The advertisement distribution apparatus according to claim 3, wherein
   the viewpoint condition includes a plurality of continuous viewpoint positions and viewing directions.

5. The advertisement distribution apparatus according to claim 1, wherein
   the advertisement space setting unit sets the advertisement space to an object appearing in video.

6. An advertisement distribution method executed by a computer, comprising:
   (a) receiving a display requests, from a first terminal device, for setting an advertisement space, the display request each including a viewpoint condition and advertisement information;
   (b) setting an advertisement space corresponding to the viewpoint condition of each of the first requests to video data of an arbitrary viewpoint position generated based on imaging data having different viewpoint positions;
   (c) receiving a second request, from a second terminal device differing from the first terminal device, for transmitting the video data of the arbitrary viewpoint position, the second request differing from the display request and including information about a viewpoint condition;
   (d) setting, to an advertisement space corresponding to the viewpoint condition specified by the second request among the advertisement spaces, the advertisement information Which is included in the display request the viewpoint condition of which corresponds to the advertisement pace corresponding to the viewpoint condition specified by the second request; and
   (e) transmitting the video data of the arbitrary viewpoint position in which the advertisement information is set in the advertisement space to the second terminal device.

7. The advertisement distribution method according to claim 6, wherein
   the display request includes payment amount information, and
   when a plurality of display requests received by the receiving overlap each other, the (b) setting includes setting a display request having a higher payment amount to the advertisement space preferentially than the other display requests.

8. The advertisement distribution method according to claim 6, wherein
   the viewpoint condition includes viewpoint position information and viewing direction information.

9. The advertisement distribution method according to claim 8, wherein
   the viewpoint condition includes a plurality of continuous viewpoint positions and viewing directions.

10. The advertisement distribution method according to claim 6, wherein
    the (b) setting includes setting the advertisement space to an object appearing in video.

11. A non-transitory computer readable storage medium containing program instructions for providing advertisement information, wherein execution of the program instructions by one or more processors of a computer system causes the one or more processors to perform:
    receiving first requests, from a first terminal device, for setting an advertisement space, the first requests each including a viewpoint condition and advertisement information;
    setting an advertisement space corresponding to the viewpoint condition of each of the first requests to video data of an arbitrary viewpoint position generated based on imaging data having different viewpoint positions;
    receiving a second request, from a second terminal device differing from the first terminal device, for transmitting the video data of the arbitrary viewpoint position, the second request differing from the first request and including information about a viewpoint condition;
    setting, to an advertisement space corresponding to the viewpoint condition specified by the second request among the advertisement spaces, the advertisement information which is included in the first request the viewpoint condition of which corresponds to the advertisement space corresponding to the viewpoint condition specified by the second request; and transmitting the video data of the arbitrary viewpoint position in which the advertisement information is set in the advertisement space to the second terminal device.

\* \* \* \* \*